United States Patent
Barchas

(10) Patent No.: US 6,395,952 B1
(45) Date of Patent: May 28, 2002

(54) CHEMICAL ABSORPTION PROCESS FOR RECOVERING OLEFINS FROM CRACKED GASES

(75) Inventor: Richard Barchas, Houston, TX (US)

(73) Assignee: Stone & Webster Process Technology, Inc., Houston, TX (US)

( * ) Notice: Subject to any disclaimer, the term of this patent is extended or adjusted under 35 U.S.C. 154(b) by 722 days.

(21) Appl. No.: 08/696,578

(22) Filed: Aug. 16, 1996

(51) Int. Cl.[7] .............................. C07C 7/148; C07C 7/10
(52) U.S. Cl. ...................... 585/833; 585/845; 585/848; 585/809
(58) Field of Search ................... 585/833, 845, 585/848, 804; 203/73, 74; 208/354

(56) References Cited

U.S. PATENT DOCUMENTS

| | | | |
|---|---|---|---|
| 2,514,294 A | * 7/1950 | Rupp | 202/40 |
| 3,401,112 A | * 9/1968 | Dunlop et al. | 208/308 |
| 3,514,488 A | 5/1970 | Uebele et al. | 260/677 |
| 3,776,972 A | 12/1973 | Tyler et al. | 260/677 |
| 4,128,595 A | * 12/1978 | Montgomery | 260/677 H |
| 4,174,353 A | 11/1979 | Marcinkowsky et al. | 585/835 |
| 4,287,752 A | 9/1981 | Ury | 73/23.1 |
| 4,328,382 A | 5/1982 | Alter et al. | 585/844 |
| 4,810,798 A | * 3/1989 | Lendle et al. | 546/353 |
| 4,900,347 A | 2/1990 | McCue, Jr. et al. | 62/24 |
| 5,157,203 A | 10/1992 | Brown et al. | 585/845 |
| 5,202,521 A | 4/1993 | Brown et al. | 585/848 |
| 5,326,929 A | * 7/1994 | Mehra et al. | 585/809 |

FOREIGN PATENT DOCUMENTS

EP  0699468  6/1996  .......... B01D/53/14

OTHER PUBLICATIONS

Barchas et al., "Olefin Recovery Via Chemical Absorption", Mar. 20, 1996, DeWitt Petrochemical Review, Houston, Texas.

* cited by examiner

Primary Examiner—Hien Tran
Assistant Examiner—Thuan D. Dang
(74) Attorney, Agent, or Firm—Hedman & Costigan, P.C.

(57) ABSTRACT

The present invention provides a method for recovering high purity olefins from cracked gas effluents or other paraffin/olefin gaseous mixtures by use of a chemical absorption process.

23 Claims, 3 Drawing Sheets

CHEMICAL ABSORPTION PROCESS FOR RECOVERING OLEFINS FROM CRACKED GASES

The present invention relates to a process for the recovery of olefins from cracked gases employing a chemical absorption process.

BACKGROUND OF THE INVENTION

The processes for converting hydrocarbons at high temperature, such as for example, steam-cracking, catalytic cracking or deep catalytic cracking to produce relatively high yields of unsaturated hydrocarbons, such as, for example, ethylene, propylene, and the butenes are well known in the art. See, for example, Hallee et al., U.S. Pat. No. 3,407,789; Woebcke, U.S. Pat. No. 3,820,955; DiNicolantonio, U.S. Pat. No. 4,499,055; Gartside et al., U.S. Pat. No. 4,814,067; Cormier, Jr. et al., U.S. Pat. No. 4,828,679; Rabo et al., U.S. Pat. No. 3,647,682; Rosinski et al., U.S. Pat. No. 3,758,403; Gartside et al., U.S. Pat. No. 4,814,067; Li et al., U.S. Pat. No. 4,980,053; and Yongqing et al., U.S. Pat. No. 5,326,465.

It is also well known in the art that these mono-olefinic compounds are extremely useful in the formation of a wide variety of petrochemicals. For example, these compounds can be used in the formation of polyethylene, polypropylenes, polyisobutylene and other polymers, alcohols, vinyl chloride monomer, acrylonitrile, methyl tertiary butyl ether and other petrochemicals, and a variety of rubbers such as butyl rubber.

Because the mono-olefins contained in the cracked gases typically contain a large amount of other components, such as diolefins, acetylenes, hydrogen, carbon monoxide and paraffins, it is highly desirable to separate the mono-olefins into relatively high purity streams of the individual mono-olefinic components. To this end a number of processes have been developed to make the necessary separations to achieve the high purity mono-olefinic components.

Multi-stage rectification and cryogenic chilling trains have been disclosed in many publications. See, for example Perry's Chemical Engineering Handbook (5th Edition) and other treatises on distillation techniques. Recent commercial applications have employed technology utilizing dephlegmator-type rectification units in chilling trains and a reflux condenser means in demethanization of gas mixtures. Typical rectification units are described in Roberts, U.S. Pat. No. 2,582,068; Rowles et al., U.S. Pat. No. 4,002,042; Rowles et al., U.S. Pat. No. 4,270,940, Rowles et al., U.S. Pat. No. 4,519,825; Rowles et al., U.S. Pat. No. 4,732,598; and Gazzi, U.S. Pat. No. 4,657,571. Especially successful cryogenic operations are disclosed in McCue, Jr. et al., U.S. Pat. No. 4,900,347; McCue, Jr., U.S. Pat. No. 5,035,732; and McCue et al., U.S. Pat. No. 5,414,170.

In a typical conventional cryogenic separation process, as shown in FIG. 1, the cracked gas in a line 2 is compressed in a compressor 4. The compressed gas in a line 6 is then caustic washed in a washer 8 and fed via a line 10 to a dryer 12. The dried gas in a line 14 is then fed to the chilling train 16. Hydrogen and methane are separated from the cracked gas by partially liquefying the methane and liquefying the heavier components in the chilling train 16. Hydrogen is removed from the chilling train 16 in a line 18 and methane is removed via a line 20, compressed in a compressor 24 and recovered in a line 26.

The liquids from the chilling train 16 are removed via a line 22 and fed to a demethanizer tower 28. The methane is removed from the top of the demethanizer tower 28 in a line 30, expanded in a turboexpander 32 and sent to the chilling train 16 as a refrigerant via a line 34. The $C_{2+}$ components are removed from the bottom of the demethanizer tower 28 in a line 36 and fed to a deethanizer tower 38. The $C_2$ components are removed from the top of the deethanizer tower 38 in a line 40 and passed to an acetylene hydrogenation unit 42 for selective hydrogenation of acetylene. The effluent from the $C_2$ hydrogenation unit 42 is then fed via a line 44 to a $C_2$ splitter 46 for separation of the ethylene, removed near the top of splitter 46 in a line 48, and ethane, removed from the bottom of splitter 46 in a line 50. Lighter gases are vented from the top of the splitter 46 in a line 49.

The $C_{3+}$ components removed from the bottom of the deethanizer tower 38 in a line 52 are directed to a depropanizer tower 54. The $C_3$ components are removed from the top of the depropanizer tower 54 in a line 56 and fed to a $C_3$ hydrogenation reactor 58 to selectively hydrogenate methyl acetylene and propadiene. The effluent from the $C_3$ hydrogenation unit 58 in a line 60 is fed to a $C_3$ splitter 62 wherein the propylene and propane are separated. The propylene is removed from the top of the $C_3$ splitter 62 in a line 64 and the propane is removed from the bottom of the $C_3$ splitter 62 in a line 66.

The $C_{4+}$ components removed from the bottom of the depropanizer tower 54 in a line 68 are directed to a debutanizer 70 for separation into $C_4$ components and $C_{5+}$ gasoline. The $C_4$ components are removed from the top of the debutanizer 70 in a line 72 and the $C_{5+}$ gasoline is removed from the bottom of the debutanizer 70 in a line 74.

However, cryogenic separation systems of the prior art, such as shown in FIG. 1, while meeting with a relatively good amount of commercial success, have suffered from various drawbacks. In conventional cryogenic recovery systems, the cracked gas is typically required to be compressed to about 450–500 psig, thereby requiring 4–5 stages of compression. Additionally, in conventional cryogenic recovery systems, five towers are required to separate the $C_2$ and $C_3$ olefins from the paraffins: a demethanizer, a deethanizer, a $C_2$ splitter, a depropanizer and a $C_3$ splitter. Because the separations of ethane from ethylene and propane from propylene, involve close boiling compounds, the splitters generally require very high reflux ratios and a large number of trays, such as on the order of 120 to 250 trays each. The conventional cryogenic technology also requires multi-level propylene and ethylene refrigeration systems, as well as complicated methane turboexpanders and recompressors or a methane refrigeration system, adding to the cost and complexity of the conventional technology. Moreover, in conventional cryogenic technology the driers are required to dry the entire cracked gas stream thereby increasing their duty.

It has also been studied in the prior art to employ metallic salt solutions, such as silver and copper salt solutions, to recover olefins, but none of the studied processes have been commercialized to date. A note is made that a commercial Hoechst plant recovering olefins from cracked gases was operated at their Gendorf works in Germany during the 1950's and early 1960's which used cuprous nitrate and an ethanolamine ligand.

For example, early teachings regarding the use of copper salts included Uebele et al., U.S. Pat. No. 3,514,488 and Tyler et al., U.S. Pat. No. 3,776,972. Uebele et al. '488 taught the separation of olefinic hydrocarbons such as ethylene from mixtures of other materials using absorption on and desorption from a copper complex resulting from the reaction of (1) a copper(II) salt of a weak ligand such as copper(II) fluoroborate, (2) a carboxylic acid such as acetic acid and (3) a reducing agent such as metallic copper. Tyler et al. '972 taught the use of trialkyl phosphines to improve the stability of $CuAlCl_4$ aromatic systems used in olefin complexing processes.

The use of silver salts was taught in Marcinkowsky et al., U.S. Pat. No. 4,174,353 wherein an aqueous silver salt stream was employed in a process for separating olefins from hydrocarbon gas streams. Likewise, Alter et al., U.S. Pat. No. 4,328,382 taught the use of a silver salt solution such as silver trifluoroacetate in an olefin absorption process.

More recently, Brown et al., U.S. Pat. No. 5,202,521 taught the selective absorption of $C_2$–$C_4$ alkenes from $C_1$–$C_5$ alkanes with a liquid extractant comprising dissolved copper(I) compounds such as Cu(I) hydrocarbonsulfonate in a one-column operation to produce an alkene-depleted overhead, an alkene-enriched side stream and an extractant rich bottoms.

Special note is also made of Davis et al., European Patent Application EP 0 699 468 which discloses a method and apparatus for the separation of an olefin from a fluid containing one or more olefins by contacting the fluid with an absorbing solution containing specified copper(I) complexes, which are formed in situ from copper(II) analogues and metallic copper.

However, none of the absorption processes to date have described a useful method of obtaining relatively high purity olefin components from olefin-containing streams such as cracked gases. The use of silver nitrate solutions, while good at separating olefins from non-olefinic hydrocarbon gases in the absence of hydrogen, cannot be used with hydrogen-containing cracked gases as the silver ions are readily reduced to metallic silver. Moreover, the use of silver nitrate solutions is significantly less attractive from an economic standpoint due to the cost of these solutions.

Regarding the copper absorption processes, none of the processes disclosed to date have proven sufficient to provide the high olefin purities for the petrochemical industry, i.e., chemical grade ethylene and propylene such as above about 95 weight percent purity; and polymer grade ethylene and propylene, such as above about 99 weight percent purity, a more preferably above about 99.9 weight percent purity.

Therefore, it would constitute a significant improvement in the state of the art if a chemical absorption process was developed to produce high purity olefins and which improved upon the conventional cryogenic systems.

SUMMARY OF THE INVENTION

It is therefore an object of the present invention to provide a process for the recovery of olefins which is sufficient to produce the olefins at high purity levels, i.e., polymer grade.

It is a further object of the present invention to provide a process for the recovery of high purity olefins which reduces the compressor requirements.

It is another object of the present invention to provide a process for the recovery of high purity olefins which eliminates the need for distillation separation of close boiling olefins and paraffins.

It is still another object of the present invention to provide a process for the recovery of high purity olefins which reduces refrigeration requirements.

It is a still further object of the present invention to provide a process for the recovery of high purity olefins which reduces drier requirements.

It is still another further object of the present invention to provide a process for the recovery of high purity olefins where the majority of the heat is supplied by low cost quench water.

To this end, the present invention provides a process for the production of high purity olefin components employing a separation system based on the separation of olefins from paraffins employing selective chemical absorption of the olefins, desorption of the olefins from the absorbent, and separation of the olefins into high purity components by distillation, thereby overcoming the shortcomings of the prior art processes.

DETAILED DESCRIPTION OF THE PRESENT INVENTION

Figure 1:
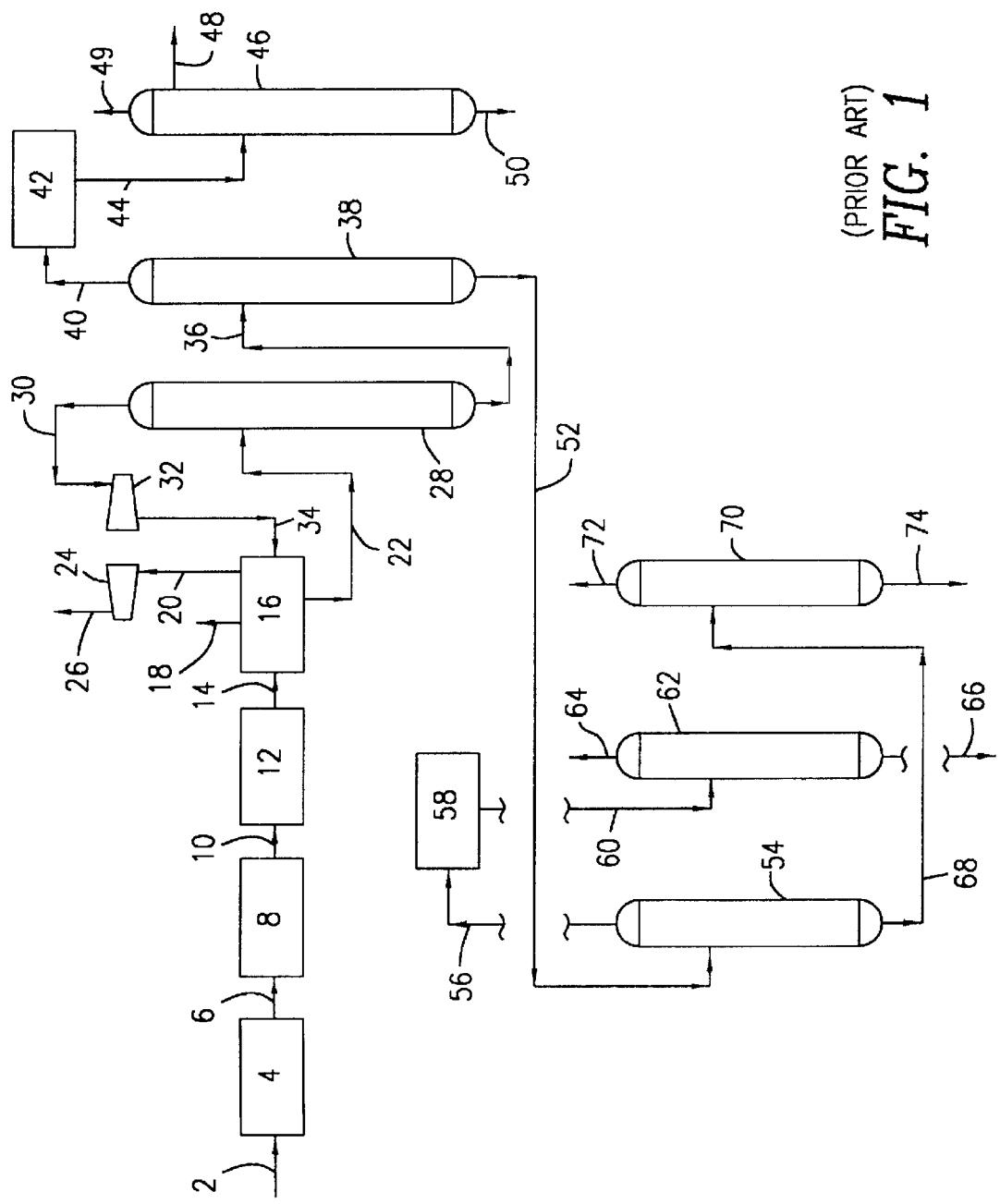
FIG. 1 depicts in flow chart manner a cryogenic process of the prior art.

The present invention provides a novel process for the recovery of olefins from cracked gases comprising the steps of (a) compressing the cracked gas to a pressure ranging from about 50 to about 250 psig to produce a compressed cracked gas stream; (b) washing the compressed cracked gas to remove acidic gases from the compressed cracked gas stream to produce a washed compressed cracked gas stream; (c) selectively hydrogenating acetylenes contained in the washed compressed cracked gas stream to produce a hydrogenated washed compressed gas stream; (d) scrubbing the hydrogenated washed compressed gas stream in an absorber tower with a scrubbing solution comprising a metallic salt to form a scrubbed gaseous stream rich in paraffins and hydrogen and a scrubbed liquid stream rich in olefins and rich scrubbing solution; (e) stripping the scrubbed liquid stream in an olefin stripper to produce a stripped gas stream rich in olefins and a lean liquid stream; and (f) separating the stripped gas stream rich in olefins into at least one of an ethylene-rich product stream, a propylene-rich product stream and a $C_4$ olefin-rich product stream.

The cracked gas streams useful as feedstocks in the process of the present invention can typically be any gas stream which contains light olefins, namely ethylene and propylene, in combination with other gases, particularly, saturated hydrocarbons. Typically, cracked gas streams for use in accordance with the practice of the present invention will comprise a mixture of one or more of butane, butenes, propane, propylene, ethane, ethylene, acetylene, methyl acetylene, propadiene, methane, hydrogen, butadiene, $C_{5+}$ components, carbon monoxide, carbon dioxide and hydrogen sulfide.

The cracked gas stream is compressed to a pressure ranging from about 50 to about 250 psig, preferably from about 70 to about 110 psig, in the compressing step (a) to produce a compressed cracked gas stream. The compression may be effected in any compressor known to those skilled in the art. For pressures in the lower end of this range, a two or three stage centrifugal compressor will generally be adequate. Higher pressures and additional compression stages may be preferred depending upon the end use of the absorber off gas and its required purity.

This relatively low compression requirement represents a significant improvement over the prior art cryogenic processes. In the prior art cryogenic process, the cracked gas is typically required to be compressed to about 450–500 psig and requires 4–5 stages of compression. In the present process, the hydrogen and paraffins present in the feed gas are generally only compressed to a pressure in the 50–250 psig range. Only the olefins have to be further compressed, as will be described hereinbelow, and then only to a pressure of from about 250 to about 350 psig. Thus, compared with conventional cryogenic recovery systems, the process of the present invention reduces compression power requirements by about 40% thereby representing a significant savings.

The compressed gas is then caustic washed to remove hydrogen sulfide and carbon dioxide, as is well known to those skilled in the art. Any of the caustic washing processes known to those skilled in the art may be employed with the present invention.

The washed and compressed gas is then selectively hydrogenated in a hydrogenation reactor system to remove substantially all of the acetylenes and dienes present in the stream. Any catalyst well known to selectively hydrogenate acetylenes and dienes can be employed in the hydrogenation reactor. The Group VIII metal hydrogenation catalysts are the most commonly used and are presently preferred. The Group VIII metal hydrogenation catalysts are ordinarily associated with a support, such as alumina. One catalyst that has been used successfully is a low surface area granular alumina impregnated with about 0.1 weight percent palladium. Examples of other catalysts which can be used include Raney nickel, ruthenium-on-aluminum, nickel arsenide-on-aluminum, and the like and mixtures thereof. The catalysts ordinarily contain a Group VIII metal in an amount ranging from about 0.01 to about 1 percent by weight of the total catalyst. These and other catalysts are more fully disclosed in the literature. See for example, La Hue et al., U.S. Pat. No. 3,679,762; Cosyns et al., U.S. Pat. No. 4,571,442; Cosyns et al., U.S. Pat. No. 4,347,392; Montgomery, U.S. Pat. No. 4,128,595; Cosyns et al., U.S. Pat. No. 5,059,732 and Liu et al., U.S. Pat. No. 4,762,956.

The conditions employed in the hydrogenation system according to the present invention can vary appreciably depending upon the compositional make-up of the stream being treated. ordinarily, the temperature and pressure will be sufficient to complete the hydrogenation of substantially all of the acetylenes and dienes. The hydrogenation may comprise a single or a series of multiple reactors, such as a three stage system. Generally, the selective hydrogenation process will be carried out over a temperature range of from about 10° C. to about 200° C. and a pressure range of from about 50 psig to about 250 psig. Hydrogen flow during the hydrogenation is at least sufficient to meet the stoichiometric requirements for converting acetylene into ethylene, methyl acetylene into propylene, propadiene into propylene and butadiene into butenes. Reaction time can vary from about a few tenths of a second to a few seconds, and is generally in the range of from about 0.5 to 2 seconds. The process can be carried out employing the catalyst in a fixed bed or other type of contacting means known to those skilled in the art.

The effluent from the acetylene hydrogenation reactor is then scrubbed in an absorption tower with a scrubbing solution to separate the paraffins from the olefins. The olefins, residual acetylenes and diolefins, and carbon monoxide are chemically complexed with the scrubbing solution and are removed from the paraffinic components. The scrubbed gases, mainly paraffins and hydrogen, are removed from the top of the absorber. The olefins and rich scrubbing solution are removed from the bottom of the absorber.

The absorption tower may have any suitable number of theoretical stages, depending upon the composition of the gaseous mixture to be treated, the recovery required for the ethylene and propylene, and the type of complexing solution employed. Sieve or valve trays are typically employed in the absorption tower. The absorber preferably operates at a pressure of about 100 psig and with the temperature maintained as low as practical while avoiding the need for refrigeration, for example from about 25 to about 40° C.

The scrubbing solution may contain any of a number of certain heavy metal ions which are known to form chemical complexes with olefins, e.g., copper(I), silver(I), platinum (II) and palladium(II). Especially useful in the practice of the present invention is a solution of a copper(I) salt. The copper(I) salts which are generally useful include, but are not limited to, copper(I) acetate, copper(I) nitrate and copper (I) sulfate, and mixtures of any of the foregoing. Preferred for use in the present invention is copper(I) nitrate.

The aqueous solvent for the copper(I) salt is preferably water buffered with a soluble organic ligand. Preferably, the organic ligand is an organic nitrogen compound such a pyridine, piperidine, hydroxypropionitrile, diethylene triamine, acetonitrile, formamide and acetamide, derivatives thereof and mixtures of any of the foregoing. See, generally, Davis et al., EP '468. Especially preferred is pyridine and/or hydroxypropionitrile.

In an especially preferred embodiment, there is used copper(I) nitrate with pyridine in a molar ratio of pyridine to copper(I) nitrate in the range of from about 1:1 to about 6:1, preferably about 2.5:1. The concentration of copper(I) salt in the aqueous complexing solution is at least about 0.5 moles of salt per liter of solvent, and preferably about 2 moles of salt per liter of solvent.

The absorber tower of the present invention may further include a water wash section in the upper portion of the absorber and a prestripping zone in the lower section of the absorber. In the water wash section, water is added to the top of the absorber tower to reduce entrainment of copper salt and to reduce vapor pressure losses of the organic ligand. A few bubble cap trays, such as one or two, may be employed in the water wash section to retain the liquid in the water wash section, while enabling a low makeup of wash water.

In the prestripper section, at least a portion of the rich scrubbing solution containing the copper(I):olefin complex is fed to a reboiler for heating to a temperature of from about 45 to about 70° C., preferably about 50 to about 55° C. to desorb most of any physically absorbed paraffins.

Additionally, where a prestripping section is employed, any $C_{5+}$ hydrocarbons present separate from the rich scrubbing solution and become trapped between the hotter bottoms and cooler middle section of the prestripping section. The $C_{5+}$ hydrocarbons are then preferably removed from the prestripping section with the rich scrubbing solution, decanted externally, water washed using a series of mixer-settlers, and recovered as is well known to those of ordinary skill in the art. Scrubbing solution recovered from the decanting step may then be fed back to the prestripping section of the absorber tower.

The bottoms of the absorber containing the copper(I) :olefin complex are removed for scrubbing solution recovery and olefin component purification. In the first step of the further processing, the absorber bottoms are fed to an olefin stripper for separation into a stripped gas stream rich in olefins and a lean liquid stream.

In the olefin stripper, the separation is effected, preferably in a packed tower, by dissociating the olefins from the metal salt complexes using a combination of increased temperature and lower pressure. At temperatures ranging from about 60 to about 100° C., preferably from about 70 to about 80° C., and pressures ranging from about 2 to about 30 psig, preferably from about 5 to about 10 psig, the ethylene, propylene and butenes readily dissociate from the metal salt complexes. Some CO is also dissociated. Inexpensive quench water can conveniently be used as the heating medium for olefin stripper temperatures in the lower end of the above temperature range, as well as any other heating means known to those of ordinary skill in the art. This quench water may be obtained from any convenient source. In a particularly preferred embodiment, where the cracked gas is obtained from the thermal cracking of a hydrocarbon feedstock, such as ethane, propane or naphtha, the quench water is obtained from the quench tower downstream of the steam cracking furnace.

The olefin stripper is preferably equipped with a water wash section in the top of the stripper to prevent entrainment of copper salts with the desorbed gases and reduce vapor pressure losses of the organic ligand.

The lean liquid stream is removed from the olefin stripper for further processing. A portion of the lean liquid stream may be passed to a reclaimer for removal of strongly absorbed components. The reclaimer operates at a higher temperature and pressure than the olefin stripper. Typically, the temperature in the reclaimer ranges from about 90 to about 130° C., preferably from about 100 to about 120° C., and the pressure ranges from about 10 to about 50 psig, preferably from about 20 to about 40 psig. The heating duty may be supplied by steam or any other means known to those skilled in the art. At these higher temperatures, residual carbon monoxide and trace acetylenes and dienes are dissociated from the metal salt complexes. The reclaimer vapors are water washed for the same reasons as the other process stream washes, as described hereinabove. The reclaimed scrubbing solution is cooled, mixed with the main scrubbing solution, and at least a portion thereof is filtered to remove any particulates, and recycled to the absorber.

An especially preferred embodiment of the present invention further includes the recovery of additional ligand from the various water washes of the absorption and stripping steps. For example, in the case of pyridine, which is miscible with water and in many hydrocarbons, it is economically advantageous to recover pyridine from the wash water from the washing of the absorber offgas, the mixed olefins from the olefin stripper, the reclaimer offgases and the $C_{5+}$ gasoline. In these water washes, "clean" stripping water preferably containing less than 100 ppmw pyridine is used. The dilute pyridine/water solution containing several weight percent pyridine which results from the washing operations is collected and sent to an extractive distillation system using a benzene entrainer for the recovery of pyridine and clean water.

A preferred extractive distillation system useful in the practice of the present invention includes a three column system. The preferred system operates at slightly above atmospheric pressure. Optionally, toluene may be substituted for benzene.

In the first stage, the wash water from the absorption, stripping and reclaiming steps is fed to a pyridine stripping column operating at a temperature ranging from about 100 to about 110° C. and a pressure ranging from about 2 to about 10 psig. In the pyridine stripping column, stripped water containing less than about 0.05 weight percent pyridine, preferably at less than about 0.02 weight percent pyridine, and more preferably at less than about 100 ppmw pyridine, is recovered from the bottoms and recycled as wash water to the absorber, olefin stripping column and reclaimer via a clean water tank.

The overhead from the pyridine stripping column comprises a pyridine-water azeotrope at approximately 57 weight percent pyridine and 43 weight percent water. The azeotrope is fed to the extractive distillation column operating at a temperature ranging from about 85 to about 110° C. and a pressure ranging from about 2 to about 10 psig. A benzene recycle stream is fed to the extractive distillation column at a higher location to provide a benzene:pyridine ratio ranging from about 0.5 to about 3.0 molar. The overhead from the extractive distillation column comprises a benzene/pyridine/water mixture, while the bottom comprises a water/pyridine solution. The overhead is condensed and decanted in a reflux drum into a benzene/pyridine phase and a water/pyridine phase. The benzene/pyridine phase is then fed to a benzene/pyridine splitter. The water/pyridine phase along with the water/pyridine column bottoms from the extractive distillation column are recycled to the pyridine stripping column.

The benzene/pyridine splitter separates benzene, with less than about 0.5 weight percent pyridine, preferably less than about 0.1 weight percent pyridine, as the overhead product, and pyridine with less than about 0.5 weight percent benzene, preferably less than about 0.1 weight percent benzene as the bottoms product. The benzene overhead stream is conveniently recycled to the extractive distillation column. The pyridine bottoms stream is recycled as make-up pyridine for use in the scrubbing solution.

The stripped gas stream rich in olefins from the olefin stripper is compressed to about a pressure ranging from about 250 to about 350 psig, preferably about 300 psig. A two stage centrifugal compressor is typically suitable for this compression, although other means known to those skilled in the art may be employed. The compressed olefins dienes. The selectively hydrogenated gaseous stream in a line 114 is then fed to an absorber tower 116 for separation of the olefins from the paraffins.

In the absorber tower 116 the feed is scrubbed with a scrubbing solution which enters at the top of the middle section of the tower 116 via a line 184. The active metal complex in the scrubbing solution chemically absorbs at least a substantial portion of the olefin components and directs them toward a bottom prestripping section 118 of the tower 116. The paraffin gases are not chemically absorbed and rise to the top of the tower 116 to a water wash section 120 where they are water washed with water entering via a line 121. The water wash removes entrained scrubbing solution from the paraffins and ligand vapors and exits the water wash section 120 of tower 116 via a line 123 for further processing as described hereinbelow with regard to FIG. 3. The paraffins and hydrogen gases are removed out of the top of tower 116 via an offgas line 122.

The scrubbing solution containing the chemically absorbed olefins proceeds downward through the tower 116 and enters a pre-stripping section 118 wherein the scrubbing solution is reboiled with a reboiler heated by quench water (not shown) to desorb any physically absorbed paraffins. The scrubbed liquid rich in olefins is removed from the bottom of tower 116 via a stream 138.

Additionally, $C_{5+}$ hydrocarbons and scrubbing solution are removed from the prestripping section 118 of tower 116 via a sidestream 124. The $C_{5+}$ hydrocarbon sidestream 124 is directed to a decanter 126 to recover the scrubbing solution which is returned to tower 116 via a line 136. The decanted $C_{5+}$ hydrocarbons are removed from the decanter 126 through a line 130 and fed to a water wash system 132 which is supplied with water via a line 133. Washed gasoline is removed from the water wash system 132 in a line 134 and contaminated water is removed in a line 135 are then dried and fractionated in a two-tower system. As the dryers are required only to dry the mixed olefins, the dryers are considerably smaller than those which have conventionally been used in conventional cryogenic recovery systems which were required to dry the entire cracked gas stream.

The dried mixed olefins are first fed to a deethylenizer tower which operates at a pressure ranging from about 250 to about 300 psig, generally about 275 psig. This is the only tower in the process of the present invention which requires refrigeration. Typically, low level propylene refrigeration is sufficient for feed chilling and to condense the overheads. Quench water or other suitable means may be employed for reboiling. Polymer-grade ethylene is taken as a side draw near the top of the deethylenizer, below a pasteurization zone. A small vent containing residual methane, hydrogen, carbon monoxide and other light gases is taken off the top of the tower.

The liquid from the deethylenizer is fed to a depropylenizer which operates at a pressure ranging from 175 to about 225 psig, typically at about 200 psig. Preferably the depropylenizer uses cooling water on the condenser and low pressure steam on the reboiler, although other cooling and heating means may be employed if desired. Propylene is taken as the overhead product and $C_{4+}$ olefins are removed from the bottoms.

DESCRIPTION OF THE PREFERRED EMBODIMENTS

Figure 2:
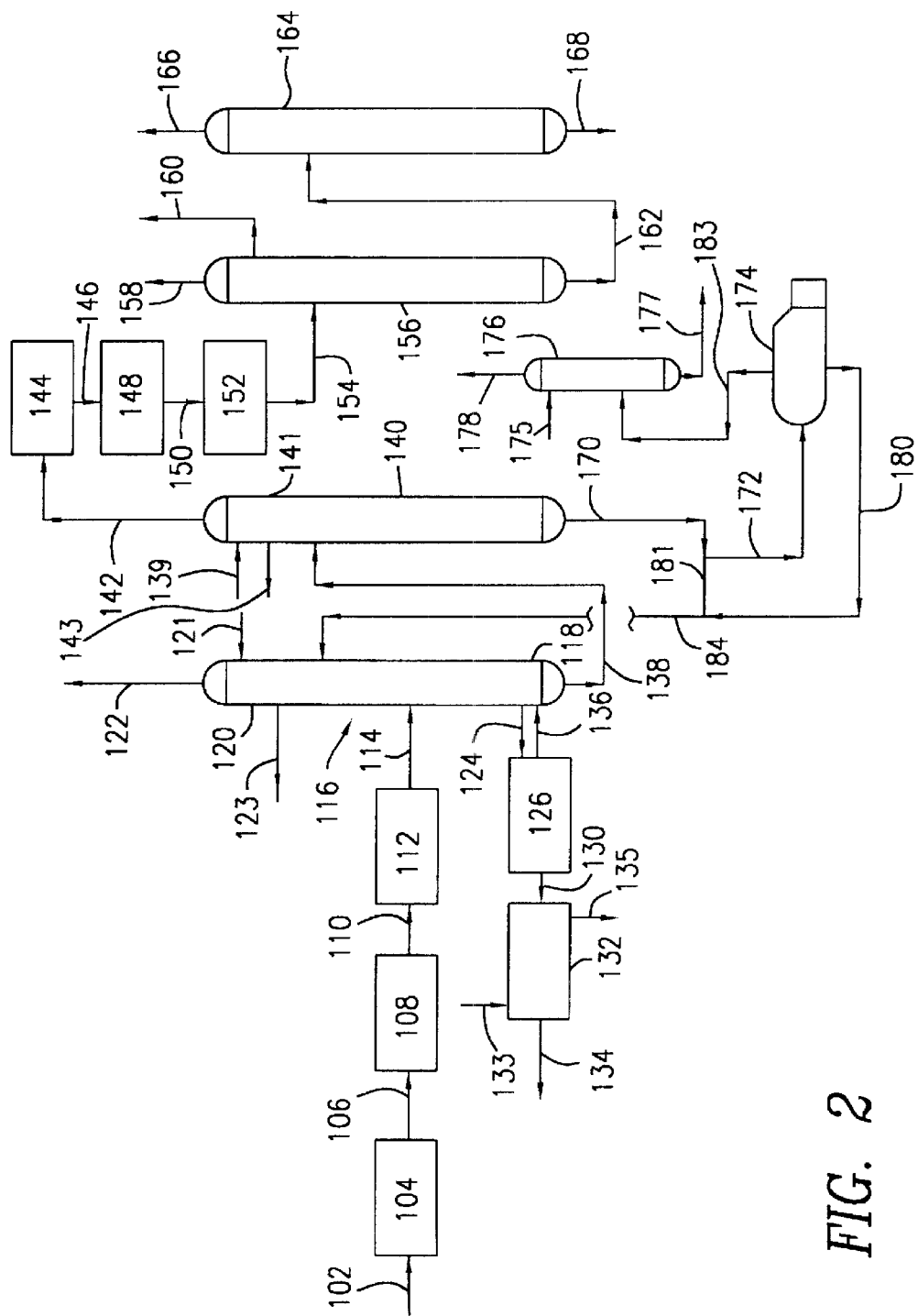
FIG. 2 depicts in flow chart manner an embodiment of the process of the present invention.

Referring to FIG. 2, a mixed gaseous hydrocarbon stream containing olefins and paraffins, such as a cracked gas stream, in a line 102 is fed to a compressor 104. The compressed gaseous stream in a line 106 is caustic washed in caustic washer 108 and fed to a hydrogenation system 112 via a line 110 for selective hydrogenation of the acetylenes and for further processing as described hereinbelow with regard to FIG. 3.

The scrubbed liquid stream rich in olefins in a line 138 is directed next to an olefin stripper 140 for desorption of the olefins from the rich scrubbing solution using a combination of increased temperature and lower pressure as described hereinabove. The dissociated olefins are washed in an upper water wash section 141 of stripper 140 which is supplied with water via a line 139 to recover any entrained rich scrubbing liquid and ligand vapors. The stripped gas stream rich in olefins issuing from the olefins stripper 140 is removed via a line 142 for further processing into ethylene, propylene and $C_{4+}$ olefin component rich streams as described hereinbelow. The spent wash is removed for further processing, or optionally returned to olefin stripper 140 via a line 143.

The lean scrubbing solution is removed from the bottom of the olefin stripper 140 via a line 170. At least a portion of the solution in the line 170 is directed to a reclaimer 174 via a line 172 for desorption of residual carbon monoxide, acetylenes and diolefins from the lean scrubbing solution at higher temperature and pressure than employed in the olefin stripper 140, as described more fully hereinabove. The desorbed gases are removed from the reclaimer 174 via a line 183 and water washed in a water wash tower 176 with water supplied via a line 175. The washed reclaimer offgas are removed from wash tower 176 via a line 178 and the contaminated water is removed via a line 177. The reclaimer 174 and water wash tower 176 can operate either in a batch mode or in a continuous mode.

The reclaimed scrubbing solution is removed from the reclaimer 174 via a line 180 and is mixed with the main scrubbing solution in a line 181 to form a scrubbing solution 184. The scrubbing solution 184 is filtered (not shown) and recycled to the absorber tower 116.

The stripped gas stream rich in olefins issuing from the olefin stripper 140 in a line 142 is directed to an olefin compressor 144 for compression. The compressed olefin rich stream is removed from the compressor 144 via a line 146 for feeding to a dryer 148. The dried compressed olefin rich stream in a line 150 is chilled in a chiller 152 with a low level propylene refrigeration system (not shown) and fed via a line 154 to a deethylenizer tower 156.

In the deethylenizer tower 156 ethylene is separated from light gases and heavier olefins using low level propylene refrigeration on the condenser (not shown) and quench water on the reboiler (not shown). Polymer-grade ethylene is removed from a line near the top of the tower 156 via a line 160. Methane, hydrogen, carbon monoxide and other light gases are removed via a vent line 158 from the top of deethylenizer tower 156. The deethylenizer bottoms are removed via a line 162 and fed to a depropylenizer tower 164.

In the depropylenizer tower 164, propylene is separated from heavier olefins using cooling water on the condenser (not shown) and low pressure steam on the reboiler (not shown). A propylene-rich product stream is taken off the top of the depropylenizer tower 164 via a line 166 and a $C_{4+}$ olefins-rich product stream is removed from the bottom via a line 168.

As described hereinabove, the present invention incorporates a series of stage water washes on the absorber offgas, mixed olefin stream from the olefin stripper and $C_{5+}$ gasoline. "Clean" stripped water containing less than about 200 and preferably less than about 100 ppmw pyridine is employed in the washing in each case. A dilute pyridine/water solution results from the washing operations. Because pyridine and water form an azeotrope (57 wt % pyridine, 43 wt % water) an extractive distillation system to recover pyridine and clean water is provided with the present invention.

Figure 3:
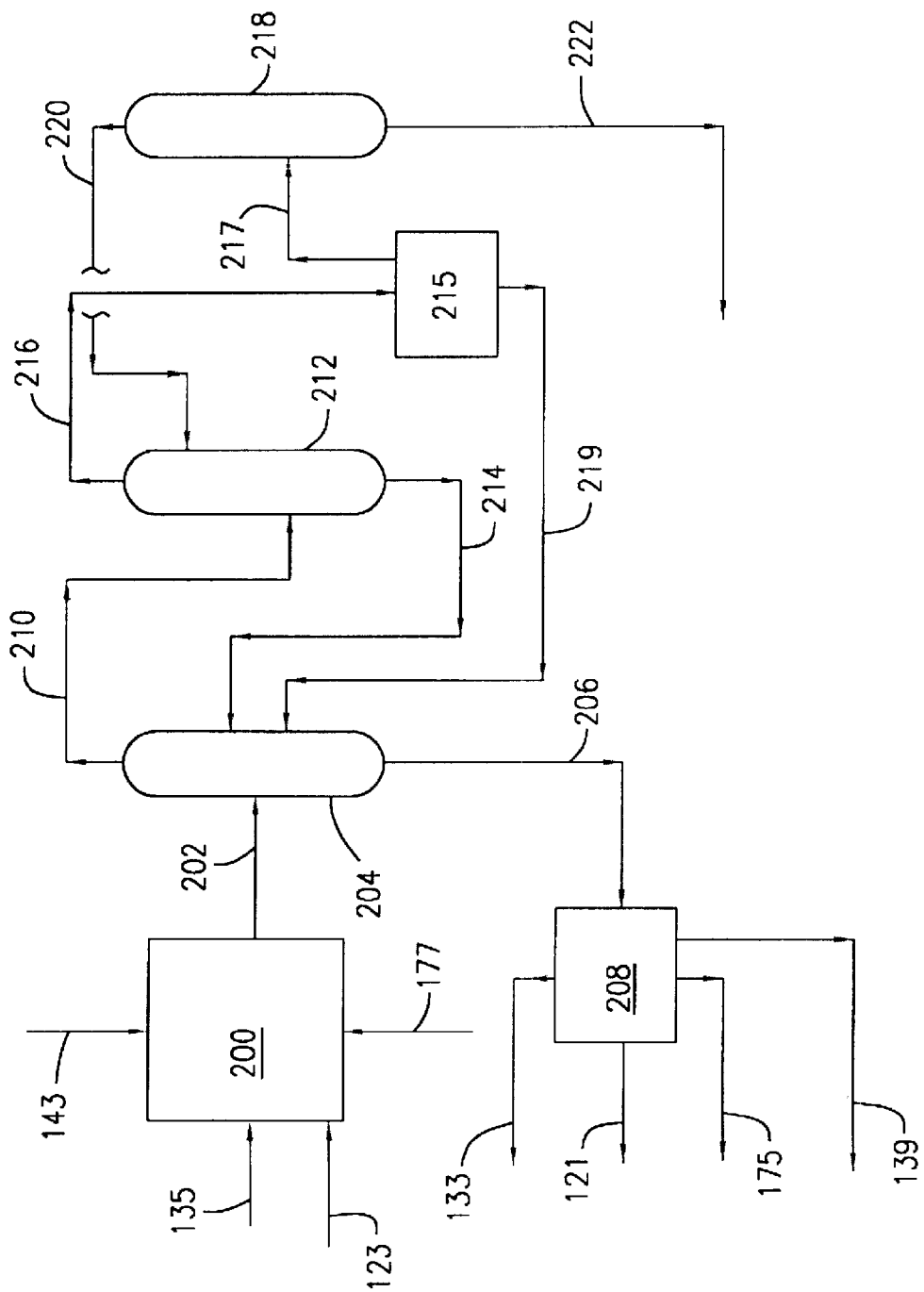
FIG. 3 depicts in flow chart manner a pyridine ligand recovery system useful in the practice of the process of the present invention.

Referring to FIG. 3, the contaminated water from the $C_{5+}$ gasoline washer 134 (FIG. 2) in a line 135, the contaminated water from the water wash section 120 of absorber tower 116 (FIG. 2) in a line 123, the contaminated water from the water wash section 141 of olefin stripper 140 in a line 143, and the contaminated water from the water wash section 176 of reclaimer 174 in a line 177, are fed to a contaminated water holding tank 200, which also serves to dampen concentration fluctuations.

The contaminated water from the holding tank 200 is fed via a line 202 to a pyridine stripping column 204. Clean water is removed from the bottom of the pyridine stripping column 204 in a line 206 and directed to a clean water tank 208, which distributes clean water to the $C_{5+}$ gasoline water wash 132 (FIG. 2), the water wash section 120 of the absorber column 116 (FIG. 2), the water wash section 141 of the olefin stripper column 140 (FIG. 2) and the water wash section 176 of the diolefin stripper column 174 (FIG. 2) via lines 133, 121, 139 and 175, respectively.

The overhead product from the pyridine stripping column 204 in a line 210 comprises the pyridine-water azeotrope and is fed to the extractive distillation column 212. Recycle benzene in a line 220 is fed to the column 212 at a higher location. The column bottoms in a line 214 is recycled to the upper section of the pyridine stripping column 204. The overhead from the column 212 containing a benzene/pyridine/water mixture is removed in a line 216 condensed (not shown), and decanted in a reflux drum 215. The lighter benzene/pyridine phase is taken from the decanter drum 215 via a line 217 and fed to a benzene pyridine splitter 218. The heavier water/pyridine phase taken from the decanter drum 215 is recycled to the pyridine stripping column 204 via a recycle line 219.

The benzene/pyridine splitter 218 separates benzene as overhead product for removal via a line 220 and recycle to the extractive distillation column 212. The pyridine is removed as a bottoms product in a line 222. The pyridine is cooled (not shown) and sent to storage for eventual recycle to the scrubber solution.

EXAMPLE

A material balance for a cracked gas from a propane feedstock was performed for the embodiment shown in FIG. 2. The stream compositions (exclusive of acid gases) are shown in Table 1 below.

TABLE 1

| Component (wt %) | Stream | | | | | | | |
|---|---|---|---|---|---|---|---|---|
| | 102 | 122 | 134 | 178 | 160 | 166 | 166 | 158 |
| $H_2O$ | 2.66 | 0.72 | — | 1.27 | — | — | — | — |
| CO | 0.19 | — | — | 98.73 | — | — | — | 60.39 |
| Hydrogen | 1.69 | 3.74 | — | — | — | — | — | 1.54 |
| Methane | 24.97 | 62.80 | 0.02 | — | — | — | — | 3.07 |
| Acetylene | 0.74 | — | — | — | — | — | — | — |
| Ethylene | 36.98 | 3.74 | 0.13 | — | 99.92 | 0.02 | — | 35.00 |
| Ethane | 3.27 | 8.64 | 0.05 | — | 0.01 | — | — | — |
| Methyl acetylene | 0.16 | — | — | — | — | — | — | — |
| Propadiene | 0.16 | — | — | — | — | — | — | — |
| Propylene | 12.14 | 1.87 | 0.15 | — | 0.07 | 99.94 | 0.37 | — |
| Propane | 6.90 | 17.54 | 0.07 | — | — | — | — | — |
| Butadiene | 2.80 | — | — | — | — | — | — | — |
| Butenes | 0.73 | 0.93 | 0.24 | — | — | 0.04 | 99.63 | — |
| n-Butane | 0.01 | 0.01 | 0.07 | — | — | — | — | — |
| $C_5$'s | 1.39 | — | 20.87 | — | — | — | — | — |
| $C_6$ NONA | 0.26 | — | 3.88 | — | — | — | — | — |
| Benzene | 3.43 | — | 51.57 | — | — | — | — | — |
| Toluene | 0.65 | — | 9.84 | — | — | — | — | — |
| $C_8$ Aromatics | 0.70 | — | 10.58 | — | — | — | — | — |
| $C_{9+}$ | 0.17 | — | 2.53 | — | — | — | — | — |
| Total flow rate kg/hr | 49,504 | 19,671 | 3,289 | 24 | 17,857 | 5,753 | 1,620 | 116 |

Many variations of the present invention will suggest themselves to those skilled in the art in light of the above-detailed description. For example, any of the known hydrogenation catalysts can be employed. Further, the reactor can be of the fixed bed type or other configurations useful in acetylene hydrogenation processes. Toluene may be substituted for benzene in the pyridine recovery system. Other metal salts and ligands which are effective in chemically selectively absorbing olefins from olefin/paraffin gaseous mixtures may be employed. All such obvious modifications are within the full intended scope of the appended claims.

All of the above-referenced patents, patent applications and publications are hereby incorporated by reference.

What is claimed is:

1. A process for the recovery of olefins from cracked gases comprising:

(a) compressing the cracked gas to a pressure ranging from about 50 to about 250 psig to produce a compressed cracked gas stream;
 (b) washing said compressed cracked gas to remove acidic gases from said compressed cracked gas stream to produce a washed compressed cracked gas stream;
 (c) selectively hydrogenating acetylenes and dienes contained in the washed compressed cracked gas stream to produce a hydrogenated washed compressed gas stream;
 (d) scrubbing said hydrogenated washed compressed gas stream in an absorber tower with a scrubbing solution comprising a metallic salt to form a scrubbed gaseous stream rich in paraffins and hydrogen and a scrubbed liquid stream rich in olefins and rich scrubbing solution;
 (e) stripping said scrubbed liquid stream in an olefin stripper to produce a stripped gas stream rich in olefins and a lean liquid stream;
 (f) separating said stripped gas stream rich in olefins into at least one of an ethylene-rich product stream, a propylene-rich product stream and a butene-rich product stream.

2. A process as defined in claim 1 wherein said cracked gas is compressed to a pressure ranging from about 70 to about 110 psig in the compressing step (a).

3. A process as defined in claim 1 wherein said acidic gases are washed from said compressed cracked gas in said step (b) with a caustic solution.

4. A process as defined in claim 1 wherein said selective hydrogenation is carried out over a catalyst comprising a Group VIII metal, at a temperature in the range of about 10° C. to about 200° C. and a pressure in the range of about 50 psig to about 250 psig.

5. A process as defined in claim 1 wherein said metallic salt comprises a copper(I) salt selected from the group consisting of cuprous acetate, cuprous nitrate, cuprous sulphate and mixtures of any of the foregoing.

6. A process as defined in claim 5 wherein said copper(I) salt comprises cuprous nitrate.

7. A process as defined in claim 1 wherein said scrubbing solution comprises a ligand for the metallic salt.

8. A process as defined in claim 7 wherein said ligand is selected from the group consisting of pyridine, methyl substituted pyridines, methoxy substituted pyridines, ethanolamine, acetonitrile, 3-hydroxypropionitrile, and mixtures of any of the foregoing.

9. A process as defined in claim 8 wherein said metallic salt comprises cuprous(I) nitrate and said ligand comprises pyridine.

10. A process as defined in claim 7 wherein said lean liquid stream is reclaimed to form a reclaimed solution.

11. A process as defined in claim 10 further comprising additionally stripping at least a portion of said lean liquid stream to produce a stripped gas stream rich in CO, acetylenes, dienes and other strongly absorbed compounds, and a liquid stream of reclaimed scrubbing solution.

12. A process as defined in claim 1 wherein said olefin separation step (f) comprises
   (i) compressing said gas stream rich in olefins to a pressure ranging from about 250 to about 350 psig to produce a compressed olefins-rich stream;
   (ii) drying said compressed olefins-rich stream to produce a dried compressed olefins-rich stream;
   (iii) fractionating said dried compressed olefins-rich stream in a deethylenizer tower equipped with a reboiler at a pressure ranging from about 250 psig to about 300 psig to produce an overhead ethylene-rich product stream and a deethylenizer bottoms stream rich in propylene; and
   (iv) fractionating said deethylenizer bottoms stream in a depropylenizer tower operating at a pressure ranging from about 175 to about 225 psig to produce an overhead propylene-rich product stream and a bottoms butene-rich product stream.

13. A process as defined in claim 12 wherein said compression step (a) compresses said gas stream rich in olefins to a pressure of about 300 psig, said deethylenizer operates at a pressure of about 275 psig and said depropylenizer operates at a pressure of about 200 psig.

14. A process as defined in claim 11 wherein said absorber tower further comprises an upper water wash section for washing said scrubbed gaseous stream to remove residual scrubbing solution in a first spent wash water stream.

15. A process as defined in claim 14 wherein said absorber tower further comprises a lower prestripping section to remove physically absorbed paraffins and remove $C_{5+}$ gasoline components from the scrubbed liquid stream.

16. A process as defined in claim 15 further comprising removing said $C_{5+}$ gasoline components and a portion of the scrubbed liquid stream from the prestripping section, decanting the removed $C_{5+}$ gasoline and scrubbed liquid stream to produce a decanted $C_{5+}$ gasoline stream and a separated scrubbed liquid stream, water washing the decanted $C_{5+}$ gasoline to produce a washed $C_{5+}$ gasoline product stream and a second spent wash water stream, and returning said separated scrubbed liquid stream to said prestripping section.

17. A process as defined in claim 16 wherein said olefin stripper is equipped with a reboiler and further comprises an upper water wash section for washing said stripped gas stream rich in olefins to remove residual scrubbing solution and recover ligand vapors in a third spent wash water stream.

18. A process as defined in claim 17 wherein said reclaimer further comprises an upper water wash section or a separate water wash column for washing said stripped gas stream rich in strongly absorbed compounds to remove residual spent scrubbing solution and recover ligand vapors in a fourth spent wash water stream.

19. A process as defined in claim 18 wherein said ligand comprises pyridine and further comprising a system for recovery of said pyridine, said recovery system comprising the steps of:
   (i) collecting said first, second, third and fourth spent wash water streams to form a spent wash water recovery stream;
   (ii) separating said spent wash water recovery stream in a pyridine stripping column to produce a stripped water bottoms stream and a water/pyridine azeotrope overhead stream;
   (iii) recycling said stripped water bottoms stream to one or more of said absorber water wash, said $C_{5+}$ gasoline wash, said olefins stripper wash and said reclaimer water wash;
   (iv) separating said water/pyridine azeotrope with a benzene or toluene entrainer in an extractive distillation column to produce a benzene/pyridine/water overhead stream and a first water/pyridine bottoms stream;
   (v) condensing and decanting said benzene/pyridine/water overhead stream to produce a benzene/pyridine stream and a second water/pyridine stream;
   (vi) recycling said first and second water/pyridine streams to said pyridine stripping column;
   (vii) distilling said benzene/pyridine stream in a splitter column to produce a benzene-rich overhead stream and a pyridine-rich bottoms stream;
   (viii) recycling said benzene-rich overhead stream to said extractive distillation column; and
   (ix) recovering said pyridine-rich bottoms stream.

20. A process as defined in claim 1 wherein said absorber tower further comprises a stripping section equipped with a reboiler, wherein said reboiler is heated with quench water.

21. A process as defined in claim 17 wherein the olefin stripper reboiler is heated with quench water.

22. A process as defined in claim 16 wherein the deethylenizer reboiler is heated with quench water.

23. A process for the recovery of olefins from cracked gases comprising:
   (a) compressing the cracked gas to a pressure ranging from about 50 to about 250 psig to produce a compressed cracked gas stream;
   (b) washing said compressed cracked gas to remove acidic gases from said compressed cracked gas stream to produce a washed compressed cracked gas stream;
   (c) selectively hydrogenating acetylenes and dienes contained in the washed compressed cracked gas stream to produce a hydrogenated washed compressed gas stream;
   (d) scrubbing said hydrogenated washed compressed gas stream in an absorber tower with a scrubbing solution comprising a metallic salt to form a scrubbed gaseous stream substantially comprising hydrogen, methane, ethane, propane and butane; and scrubbed liquid stream substantially comprising ethylene, propylene, butylenes and scrubbing solution;
   (e) stripping said scrubbed liquid stream in an olefin stripper to produce a stripped gas stream rich in olefins and a lean liquid stream; and
   (f) separating said stripped gas stream rich in olefins into at least one of an ethylene-rich product stream, a propylene-rich product stream and a butene-rich product stream.

* * * * *